(12) United States Patent
Coombs et al.

(10) Patent No.: US 9,428,022 B2
(45) Date of Patent: Aug. 30, 2016

(54) SYSTEM AND METHOD FOR CONTROLLING A FLUID SUSPENSION SYSTEM

(71) Applicant: Air Lift Company, Lansing, MI (US)

(72) Inventors: Joshua D. Coombs, East Lansing, MI (US); Aaron Mulder, Okemos, MI (US); Brian R. Vinson, Howell, MI (US)

(73) Assignee: Air Lift Company, Lansing, MI (US)

( * ) Notice: Subject to any disclaimer, the term of this patent is extended or adjusted under 35 U.S.C. 154(b) by 781 days.

(21) Appl. No.: 13/653,621

(22) Filed: Oct. 17, 2012

(65) Prior Publication Data

US 2014/0107892 A1  Apr. 17, 2014

(51) Int. Cl.
*B60G 17/016* (2006.01)
*B60G 11/27* (2006.01)
*B60G 17/015* (2006.01)

(52) U.S. Cl.
CPC ........... *B60G 11/27* (2013.01); *B60G 17/0155* (2013.01); *B60G 2202/152* (2013.01); *B60G 2206/0116* (2013.01); *B60G 2400/51222* (2013.01); *B60G 2500/30* (2013.01); *B60G 2500/302* (2013.01); *B60G 2600/11* (2013.01); *B60G 2600/1875* (2013.01); *B60G 2600/20* (2013.01); *B60G 2800/7022* (2013.01); *B60G 2800/914* (2013.01)

(58) Field of Classification Search
CPC ................................. B60G 11/27; B60K 6/48
USPC ...................................... 701/40, 22
See application file for complete search history.

(56) References Cited

U.S. PATENT DOCUMENTS

| 5,684,698 | A | * | 11/1997 | Fujii | B60G 17/018 180/41 |
| 6,389,341 | B1 | * | 5/2002 | Davis | B60G 17/0152 188/266.5 |
| 2001/0005803 | A1 | * | 6/2001 | Cochofel | B60G 17/0185 701/1 |
| 2002/0035423 | A1 | * | 3/2002 | Shank | B60G 17/0185 701/37 |
| 2003/0075881 | A1 | * | 4/2003 | Delorenzis | B60G 17/0432 280/5.5 |
| 2003/0075882 | A1 | * | 4/2003 | Delorenzis | B60G 17/0164 280/5.508 |
| 2004/0245732 | A1 | * | 12/2004 | Kotulla | B60G 11/44 280/5.502 |

(Continued)

*Primary Examiner* — Stefanos Karmis
*Assistant Examiner* — Michael E Butler
(74) *Attorney, Agent, or Firm* — Warner Norcross & Judd LLP

(57) ABSTRACT

The present invention provides a control system operable to raise and lower the height of a vehicle based in part on the response characteristics of the vehicle's suspension and vehicle loading. The control system may develop a vehicle suspension system response by mapping a correlation between changes in air pressure of air springs in the vehicle's suspension and a test valve-open-time. During operation, the control system may predict a valve-open-time in response to a command relating to a target air pressure for the air springs, and then inflate or deflate one or more of the air springs for a duration substantially equal to the predicted valve-open-time. This process may be iterated until the control system achieves, within an acceptable degree of error, the target air pressure for the one or more air springs.

18 Claims, 8 Drawing Sheets

(56) References Cited

U.S. PATENT DOCUMENTS

| | | | | |
|---|---|---|---|---|
| 2005/0004732 A1* | 1/2005 | Berry | .................... | B60W 10/06 |
| | | | | 701/48 |
| 2006/0064223 A1* | 3/2006 | Voss | ....................... | B62K 25/04 |
| | | | | 701/52 |
| 2007/0080515 A1* | 4/2007 | McAndrews | .......... | B62K 25/04 |
| | | | | 280/276 |
| 2008/0224428 A1* | 9/2008 | Smith | ................ | B60G 17/0185 |
| | | | | 280/5.514 |
| 2008/0272561 A1* | 11/2008 | Monk | .................... | B60G 21/06 |
| | | | | 280/5.507 |
| 2010/0138116 A1* | 6/2010 | Coombs | ............. | B60G 17/0523 |
| | | | | 701/48 |
| 2012/0046827 A1* | 2/2012 | Larkins | ................ | B60G 17/018 |
| | | | | 701/37 |
| 2013/0292218 A1* | 11/2013 | Ericksen | ............... | F16F 9/5126 |
| | | | | 188/266.2 |
| 2015/0224845 A1* | 8/2015 | Anderson | ........... | B60G 17/019 |
| | | | | 701/37 |

\* cited by examiner

| Address | 00 | 01 | 02 | 03 | 04 | 05 | 06 | 07 | 08 | 09 | 0A | 0B | 0C | 0D | 0E | 0F | ASCII |
|---|---|---|---|---|---|---|---|---|---|---|---|---|---|---|---|---|---|
| 00 | FF | FF | FF | FF | FF | FF | FF | FF | FF | FF | FF | FF | FF | FF | FF | FF | ................ |
| 10 | 27 | 20 | 20 | 26 | 26 | 4D | 72 | FF | FF | FF | 78 | 9B | FF | FF | FF | FF | '  &&Mr....x.... |
| 20 | C5 | 00 | 09 | F7 | FF | 00 | 08 | F8 | FF | FF | FF | FF | 03 | A2 | C8 | A3 | ................ |
| 30 | FF | A4 | FF | A5 | FF | A6 | FF | A7 | FF | A8 | FF | A9 | FF | AA | FF | AB | ................ |
| 40 | FF | AC | FF | AD | FF | AE | C5 | AF | FF | 94 | FF | 95 | FF | 96 | FF | 97 | ................ |
| 50 | FF | 98 | FF | 99 | FF | 9A | FF | 9B | FF | 9C | FF | 9D | FF | 9E | FF | 9F | ................ |
| 60 | 00 | 10 | 35 | 21 | 53 | 0A | 9B | 02 | 02 | 02 | 01 | 02 | 02 | 03 | 03 | 04 | ..5!S........... |
| 70 | 07 | FE | 67 | 02 | 04 | 03 | 02 | 02 | 03 | 02 | 03 | 04 | 06 | FE | FE | FF | ..g............. |
| 80 | FF | FF | FF | FF | FF | FF | FF | FF | FF | FF | 0A | FF | FF | FF | FF | FF | ................ |
| 90 | 01 | 10 | 35 | 19 | 96 | 0A | 9B | 02 | 02 | 02 | 28 | 0D | 0C | 0B | 0B | 0B | ..5......(...... |
| A0 | 0D | FE | 6B | 08 | 0F | 11 | 13 | 15 | 17 | 23 | FE | 06 | FE | FE | FE | FE | ..k............. |
| B0 | FF | FF | FF | FF | FF | FF | FF | FF | FF | FF | FF | FF | FF | FF | FF | FF | ................ |
| C0 | 0B | 17 | 23 | 29 | 33 | 3D | 48 | 51 | 5B | 64 | FE | FE | FE | FE | FE | FF | ..#)3=HQ[d...... |
| D0 | 5C | 52 | 46 | 3D | 34 | 28 | 20 | 17 | 0D | 05 | FE | FE | FE | FE | FE | FF | \RF=4(.......... |
| E0 | 0D | 17 | 1E | 28 | 32 | 3C | 46 | 50 | 5A | 64 | FE | FE | FE | FE | FE | FF | ...(2<FP Zd..... |
| F0 | 61 | 57 | 4D | 43 | 39 | 2F | 25 | 1B | 11 | FE | FE | FE | FE | FE | FF | FF | aWMC9/%......... |

Fig. 9

SYSTEM AND METHOD FOR CONTROLLING A FLUID SUSPENSION SYSTEM

BACKGROUND OF THE INVENTION

The present invention relates to controlling fluid suspension systems, and more particularly to controlling fluid pressure within the fluid suspension system of a vehicle.

Fluid suspension systems are known for providing a softer, more comfortable ride for a vehicle. Other common applications for fluid suspension systems include: raising or lowering a vehicle; leveling a vehicle that is under a load; leveling recreational vehicles parked on inclined surfaces; and altering the performance characteristics of a vehicle. Conventional fluid suspension systems include one or more pneumatic devices, such as air springs, connected between the vehicle axles and the vehicle chassis. Pressurized air from an air supply can be forced into or exhausted from one or more of the air springs to provide the vehicle with desired suspension characteristics. Such a system may be installed on a vehicle by the original equipment manufacturer, or they may be purchased as aftermarket products that are substitutes or supplements for conventional steel spring suspensions.

As mentioned above, fluid suspension systems may be used to adjust the ride height of a vehicle. In order to achieve and maintain a suspension ride height, control systems have been employed that implement closed loop algorithms with feedback. Feedback such as height control is employed where the suspension deflection is measured and air is either added or vented to inflate or deflate the air springs to achieve and maintain suspension height. Height control varies from mechanical height control valves to electronic height sensor-based electronic control systems. These systems operate by monitoring actual suspension height; once the suspension is at its target height, the valves close to stop inflation or deflation. This is referred to as "closed loop control": direct measurement of height is used to "know" when target heights are achieved, and valves are directly actuated to start or stop inflation or deflation based on the measured height.

While height control systems may be desired for their accurate closed-loop control of height, these systems may suffer from the added cost and complexity of height sensors that are exposed to the aggressive under-vehicle environment around the tire. Rocks, snow, mud and debris may disable or damage the height sensors. It is also time consuming to mount height sensors on vehicles that have not been designed for them—it is especially labor intensive to install aftermarket height sensors on passenger cars where packaging is tight. Custom brackets specific to each vehicle are often fabricated and welded or bolted in place, and then the height sensor wiring is routed to each sensor. The height sensor install typically takes sixteen hours, with the rest of the control system taking less time—four hours typically.

Other closed-loop systems have been employed using pressure-based feedback. However, these pressure-based systems are either not cost effective or in some circumstances unable to obtain accurate pressure readings during inflation and deflation of the air springs. For example, accurate real-time reading of air spring pressure may be obtained inside the air spring, but doing so is generally not cost effective. Pressure sensors placed remote from the control system and within the air spring may be more expensive to implement, more prone to failure and increase installation time. In-line air pressure, on the other hand, may be more cost effective and robust and easier to install (no wiring harnesses out to air spring mounted pressure sensors that are subject to the aggressive under-vehicle environment). But in-line pressure feedback systems encounter issues with dramatic air pressure changes during inflation and deflation, due in part to the high compressibility of air. That is, the pressure sensor reads "in-line" pressure, where the pressure reading can nearly equal tank pressure (approximately 150 psi) when inflating and atmospheric pressure when deflating. This effect may mask the actual pressure within the air spring, causing the feedback control system to be less reliable. The valves may be closed (no inflate or deflate) for a few seconds to allow pressure to equalize in the air spring and in-line before an accurate pressure reading can be taken at the manifold, but continually adjusting pressure and then pausing for an accurate measurement increases the loop time.

Further, because air spring pressure may not directly correlate to vehicle suspension height, conventional pressure-based systems do not always achieve target suspension height. Vehicles experience variations of loading (people, equipment, supplies, towed trailers, etc); to accommodate this load variation and maintain a consistent height, the air spring pressure may be changed. But without knowing a correlation between suspension height, air spring pressure and loading conditions, the conventional pressure-based closed-loop system may be unaware of whether and how much to increase or decrease the pressure. For example, conventional systems have been programmed for operating with a specific vehicle make and model (e.g., a Honda Civic), but when used in connection with other vehicles, such conventional systems may not achieve target suspension height due in part to differences in suspension characteristics between vehicle makes, and sometimes among vehicles of the same model.

SUMMARY OF THE INVENTION

The present invention provides a control system operable to raise and lower the height of a vehicle based in part on the response characteristics of the vehicle's suspension and vehicle loading. The control system may develop a vehicle suspension system response by mapping a correlation between changes in air pressure of air springs in the vehicle's suspension and a test valve-open-time. During operation, the control system may predict a valve-open-time in response to a command relating to a target air pressure for the air springs, and then inflate or deflate one or more of the air springs for a duration substantially equal to the predicted valve-open-time. This process may be iterated until the control system achieves, within an acceptable degree of error, the target air pressure for the one or more air springs.

In one embodiment, the control system includes a valve, a pressure sensor, and control circuitry. The valve may be adapted to selectively control fluid flow to and from the fluid spring, and the pressure sensor may be adapted to sense the fluid pressure of the fluid spring. The control circuitry may be operatively coupled to the fluid valve and the pressure sensor, and may be adapted to control a valve-open-time of the fluid valve in order to at least one of pressurize and depressurize the fluid spring. The control circuitry may be further adapted to develop a vehicle suspension system response by mapping a change in fluid pressure of the fluid spring with a test valve-open-time, to receive an input relating to a target fluid pressure for the fluid spring, and to predict, based on the vehicle suspension system response, a predicted valve-open-time to target achieving the target fluid pressure in the fluid spring, thereby implementing an open-loop control system.

In one embodiment, after attempting to achieve the target fluid pressure by activating the valve for a duration substantially equal to the predicted valve-open-time, the control system may determine if a substantial difference exists between the fluid pressure of the fluid spring and the target fluid pressure. If there is a substantial difference, the control system may predict another predicted valve-open-time to target achieving the target fluid pressure, and attempt again to achieve the target fluid pressure.

In one embodiment, a user may help develop an overcompensation factor for the vehicle suspension system response in order to tailor the control system to the user's desired preferences. For example, the overcompensation factor may be used to increase the valve-open-time in order to increase how fast the suspension system raises or lowers. Conversely, the overcompensation factor may be used to decrease the valve-open-time to decrease how fast the system raises and lowers.

In one embodiment, the control system is adapted to store at least one preset that associates a desired height of the vehicle with a target fluid pressure, where the vehicle has a known loading. In this way, the control system may operate similar to a height based fluid control system but without height sensors. The presets may, for example, include a desired ride height, an obstacle clearance preset, and a parked state preset.

In one aspect, the present invention provides a method for controlling fluid pressure of a fluid spring within a vehicle. The method may include the step of mapping a vehicle suspension system response by stepwise pressurizing the fluid spring and storing a data point for each step. The data points form part of the vehicle suspension system response, and may include, for each step, an association between a change in fluid pressure and a test valve-open-time. The method may also include the step of receiving an input relating to a target fluid pressure for the fluid spring, and predicting, based on the vehicle suspension system response, a predicted valve-open-time in order to change the fluid pressure of the fluid spring to target achieving the target fluid pressure.

In another aspect, the present invention provides a controller for a fluid suspension system. More specifically, the controller may control inflation and deflation of a fluid spring of the fluid suspension system. The controller may include inputs and outputs configured to receive pressure information from pressure sensors and configured to control activation of valves to selectively control fluid flow to and from the fluid spring. The controller may also include control circuitry programmed to map a vehicle suspension system response by stepwise pressurizing the fluid springs and storing a data point for each step. The data points form part of the vehicle suspension system response. The control circuitry may also be programmed to receive an input relating to a target fluid pressure for the fluid spring, and predict, based on the vehicle suspension system response, a predicted valve-open-time for the at least one valve in order to change the fluid pressure of the fluid spring to target achieving the target fluid pressure.

The present invention provides an effective control system that may reduce install time, reduce equipment cost, and improve overall system robustness. These and other objects, advantages, and features of the invention will be more fully understood and appreciated by reference to the description of the current embodiments and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 9 is a table showing a calibration map used in the control system of the current embodiment.

DESCRIPTION OF THE CURRENT EMBODIMENT

I. Overview

Figure 1:
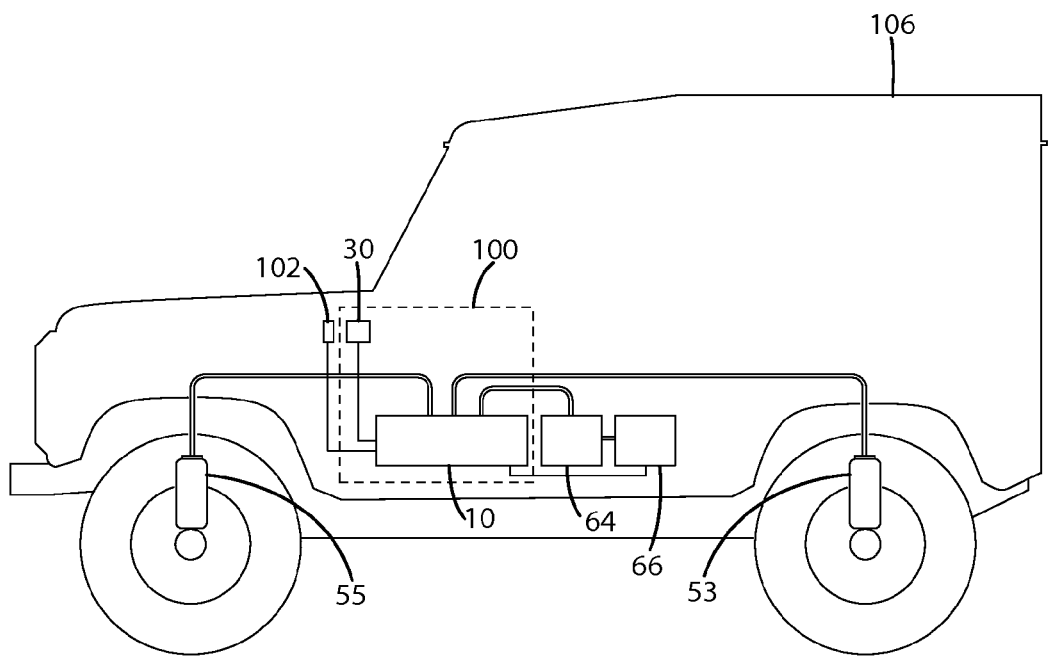
FIG. 1 is a representative view of a vehicle having a control system of the current embodiment.
Figure 2:
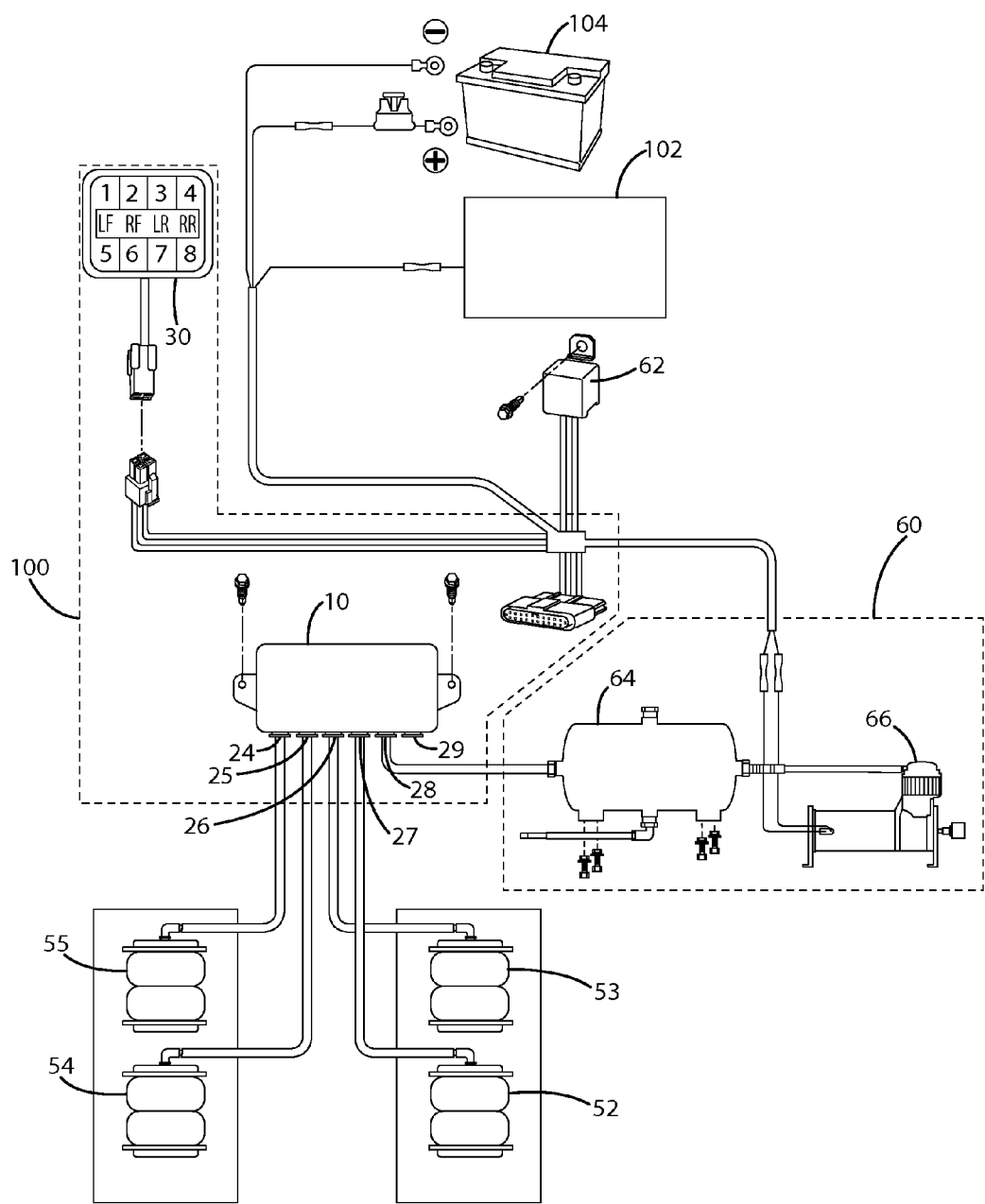
FIG. 2 is a representative view of the control system of the current embodiment interfacing with the vehicle and a suspension system of the vehicle.
Figure 3:
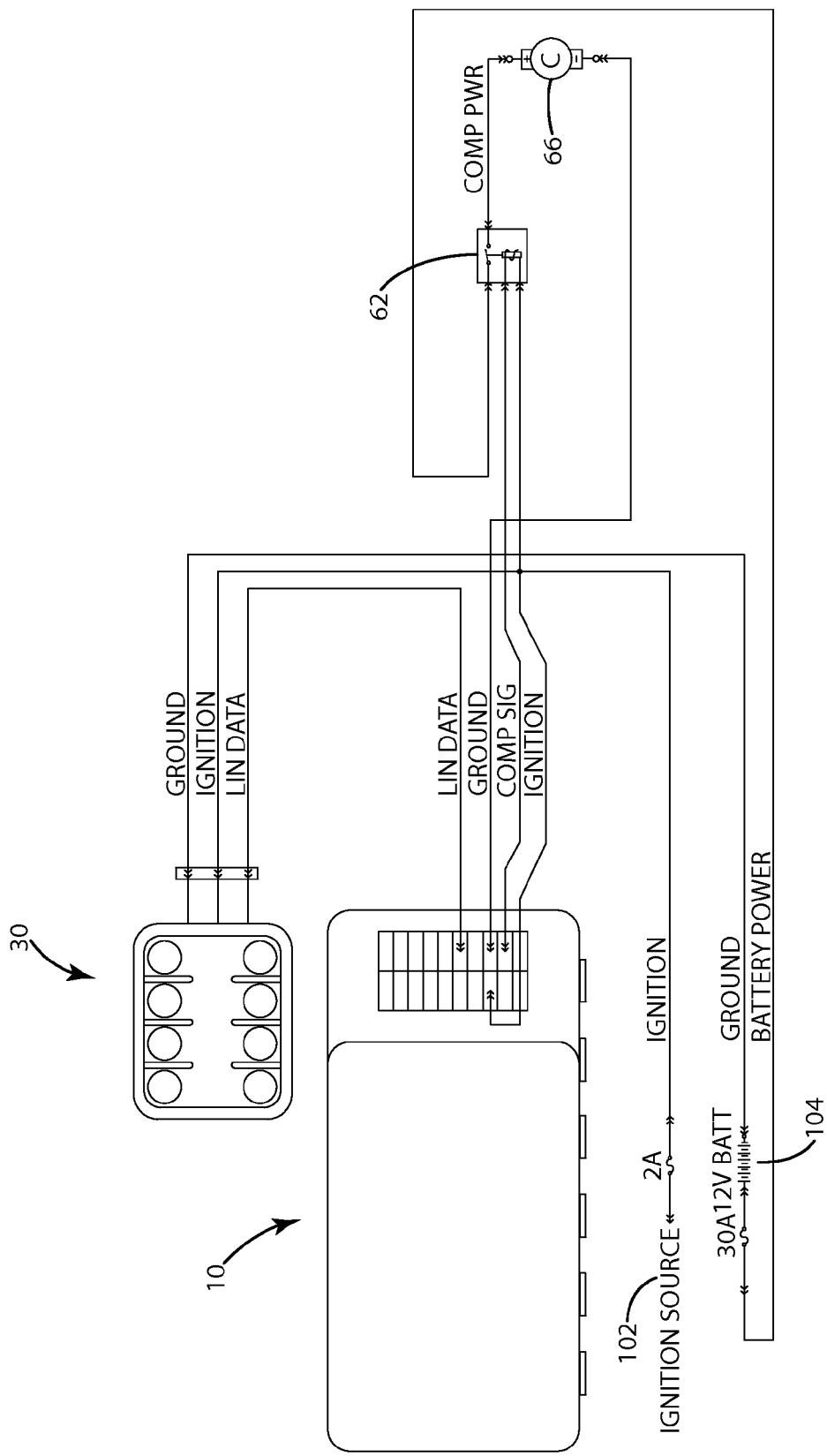
FIG. 3 is an electrical schematic of the control system of the current embodiment interfacing with the vehicle and the suspension system of the vehicle.

A vehicle suspension control system according to one embodiment of the present invention is shown in FIGS. 1-3 and generally designated 100. The control system 100 is operable to raise and lower the height of the vehicle 106 based in part on the response characteristics of the vehicle's suspension and vehicle loading. In the illustrated embodiments of FIGS. 1-2, the suspension of the vehicle 106 includes air springs 52-55 adapted to inflate and deflate in order to raise and lower the height of the vehicle. The control system 100 may be capable of controlling the supply of air to each of the air springs 52-55, thereby changing vehicle height. More specifically, the control system 100 may inflate or deflate each of the air springs 52-55 for a period of time described herein as the valve-open-time. Prior to operation, the control system 100 may develop a vehicle suspension system response by mapping a correlation between changes in air pressure of the air springs 52-55 and valve-open-time. Based on the system response, the control system 100 may predict, during operation, a valve-open-time in response to a command relating to a target air pressure for each of the air springs 52-55, and then inflate or deflate one or more of the air springs 52-55 for a duration substantially equal to the predicted valve-open-time. This process may be iterated until the control system 100 achieves, within an acceptable degree of error, the target air pressure for the one or more air springs 52-55.

II. Structure

The control system 100 includes a controller 10, which in the illustrated embodiments of FIGS. 1-3, is integrated with a manifold 20 for distribution of air. For purposes of disclosure, the manifold 20 is described in connection with the control system 100, but the manifold 20 may be separate from the control system 100 and may be separate from the controller 10 in alternative embodiments. The control system 100 may be capable of receiving air from an air supply system 60 and distributing that air to inflate one or more air springs 52-55 within the vehicle 106. The air supply system 60 in the illustrated embodiment includes a compressor 66, relay 62 and reservoir tank 64, typically configured to supply air at an approximate pressure of 120 psi. The control system 100 may also be capable of deflating one or more of the air springs 52-55 by exhausting air through the manifold 20. Although the control system 100 is described in connection with a pneumatic system (e.g., an air supply system 60 and air springs 52-55), alternative embodiments that use fluid other than air are contemplated.

The control system 100 may also include a user command interface 30 mounted within the cabin of the vehicle 106, allowing a user to provide commands to the control system 100 for raising and lowering the vehicle 106. For example, the command interface 30 may allow the user to select one or more presets corresponding to a target pressure within the air springs 52-55, which may be associated with a desired vehicle height. The control system 100 in the current embodiment powers-up in response to a signal from the ignition system 102 of the vehicle 106 such that the control system 100 turns on with the vehicle 106. In alternative embodiments, the control system 100 may activate in response to an accessory switch output or another output signal from the vehicle 106. Power for operation of the control system 100 may be received from the vehicle battery 104.

The air springs 52-55 shown in conjunction with the current embodiment function as lift mechanisms, and are mounted between the wheel axle and chassis of the vehicle so that they can raise and lower the vehicle in response to being inflated or deflated. As shown in the illustrated embodiment, air spring 52 is associated with the right rear axle, air spring 53 is associated with the left rear axle, air spring 54 is associated with the right front axle and air spring 55 is associated with the left front axle. In alternative embodiments, other lift mechanisms besides the air springs 52-55, such another type of fluid bladder, may be used with the control system 102 to raise and lower the vehicle 106.

In the illustrated embodiments of FIGS. 1 and 2, the air springs 52-55 are in fluid communication with the manifold 20, which is in fluid communication with the fluid supply system 60 through conventional connections such as pneumatic or hydraulic hoses. The manifold 20 of the controller 10 includes ports 24-27 that connect respectively to the air springs 52-55, and are capable of supplying or exhausting air through the flow path between the air springs 52-55 and the manifold 20 of the controller 10. The manifold 20 also includes an inlet port 28 connected to the fluid supply system 60 for receiving air therefrom, and further includes an exhaust port 29 for exhausting air from, or deflating, one or more of the air springs 52-55.

Figure 4:
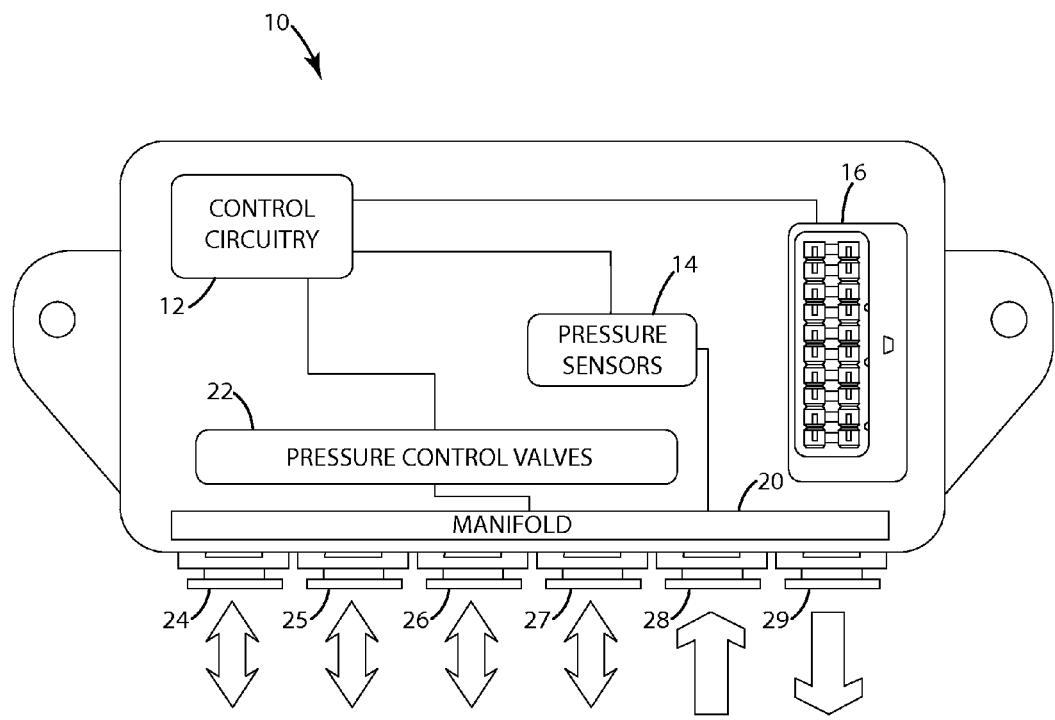
FIG. 4 is a representative view of a controller of the control system of the current embodiment.
Figure 5:
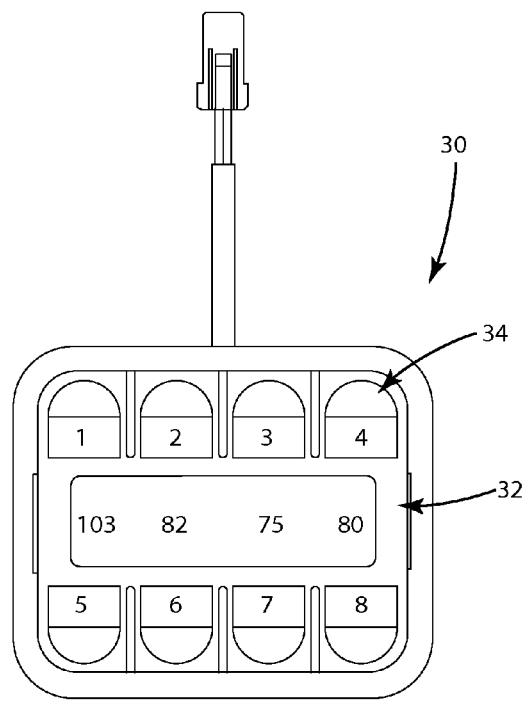
FIG. 5 is a representative view of a user command interface of the control system of the current embodiment.

Turning to the illustrated embodiments of FIGS. 4 and 5, the controller 10 and the user command interface 30 are shown in further detail. In addition to the manifold 20, the controller 10 includes control circuitry 12, such as an electronic control unit (ECU), pressure sensors 14, and control valves 22. In the illustrated embodiment, these components are integrated in the controller 10, but one or more of them may be separate from the controller 10 or be integrated with another component separate from the controller 10 in alternative embodiments. For example, the manifold 20 and control valves 22 may be integrated together in a separate component from the controller 10.

The control circuitry 12 may include circuitry capable of controlling the state of the control valves 22 and receiving sensor information from the pressure sensors 14. Such circuitry, for example, may include a microprocessor or microcontroller programmed to control inflation, deflation, and maintenance of air pressure in the air springs 52-55. The circuitry may also include interface circuitry to allow the microprocessor to control the state of the control valves 22 and receive sensor information from the pressure sensors 14.

The control circuitry 12 may include input circuitry in electrical communication with pressure sensors 14 to monitor air pressure of each of the air springs 52-55. The pressure sensors 14 may sense pressure of the air springs 52-55 in the flow path between the control valves 22 and the air springs 52-55, and provide an output corresponding to the sensed pressure. The control circuitry 12 may also include output circuitry capable of controlling operation of the control valves 22 in order to inflate and deflate of each of the air springs 52-55. For example, the control circuitry 12 may receive communication, such as a digitized serial message or an analog signal, from each of the pressure sensors 14 representative of the air pressure of each of the air springs 52-55. Based on this information and on commands from the user command interface 30, the control circuitry 12 may activate one or more of the control valves 22 associated with air springs 52-55 in order to change the air pressure of the associated air springs 52-55.

The controller 10 in the illustrated embodiment also includes an electrical interface 16 configured to communicate with external systems, such as the user command interface 30, the ignition system 102 and the fluid supply system 60. The user command interface 30 may include a display 32, one or more user inputs 34, and command circuitry (not shown) capable of communicating with the controller 10. The user command interface 30 may be mounted within the cabin of the vehicle 106, allowing the controller 10 to be installed in a separate location, if desired. In the illustrated embodiment, the user command interface 30 is directly connected to the electrical interface 16 of the controller 10. In alternative embodiments, the command interface 30 may communicate with the controller 10 using a communication bus, such as a controlled area network (CAN) bus provided within the vehicle 106. The user command interface 30 provides an interface for the user to program and operate the controller 10, and during operation, may display pressure information for each air spring 52-55 in the vehicle suspension system.

The controller 10 may be programmed to implement a predictive open-loop control system, where the system is capable of calibrating to a vehicle and its installed system, "mapping" the vehicle's air suspension response to manifold valve-actuated pressure changes. This calibrated "map" may allow the controller 10 to calculate a valve-open-time to achieve air spring target pressures. Empirically, the controller 10 has been able to successfully achieve target pressures within +/−3 psi in three or fewer iterations.

In the current embodiment, the mapping process includes developing a vehicle suspension system response. In this way, the control system 100 may tailor itself to the particular vehicle in which it is installed, accounting for varying suspension geometries, friction, and vehicle loading. For example, a vehicle with 300 lbs. of stereo equipment may have a different response from the same vehicle without. The controller 10 may map the vehicle response by stepwise inflating each air spring 52-55 from 0 psi to 100 psi, and deflating each air spring 52-55 from 100 psi to 0 psi. Each control valve 22 may be opened for a finite time, and then closed to allow pressure to settle in the system. In the current embodiment, each control valve is opened for approximately 5 ms and allowed to settle after closing for approximately 500 ms. It should be understood that these times may be different in other embodiments, and may be variable during operation.

Once the pressure has settled, the valve-open-time, also known as VOT, and the associated pressure change are logged as a data point in the mapping process. Each step of opening the control valve 22 and logging a pressure change may help to form a vehicle suspension system response. In the current embodiment, there are ten increments for the inflation event and ten decrements for the deflation event. There may be more or fewer steps depending on the desired resolution of the map, but empirically, using ten steps has provided adequate results.

By logging ten data points in either direction—inflation and deflation—the controller 10 may predict the valve-open-time to achieve a particular target pressure based on the current pressure. That is, the twenty data points for the inflation and deflation events may form a valve-open-time map of pressure response per axle for the vehicle. This valve-open-time map may be used to predict how long to open each valve 22 to achieve a target pressure. For example, if a user wants to inflate the air springs 54-55 of the vehicle's front axle from 0 psi to 80 psi, the controller 10 could use the valve-open-time map to predict the valve-open-time for the control valves 22 associated with air springs 54-55. In this example, inflating an air spring 54-55 from 0-80 psi may take 100 bursts of 5 ms in duration (equal to 500 ms of total valve-open-time), but may take longer than 500 ms to fill from 0-80 psi in fewer than 100 bursts or even in one shot. The valve-open-time map may be used in conjunction with a factor to predict the appropriate valve-open-time to try to achieve such a 0-80 psi change in less than 100 iterations, including, for example, in one or two or three iterations. In other words, in this example, the valve-open-map may be used to calculate the number of 5 ms bursts to try to achieve a target pressure. That number may then be multiplied by a factor, such as the gain factor or overcompensation factor described herein, to in order to calculate a predicted valve-open-time to try to achieve the target pressure. This way, the target pressure may be achieved without performing a large number of short 5 ms bursts, stepping toward the target pressure 5 ms at a time.

III. Operation

Figure 6:
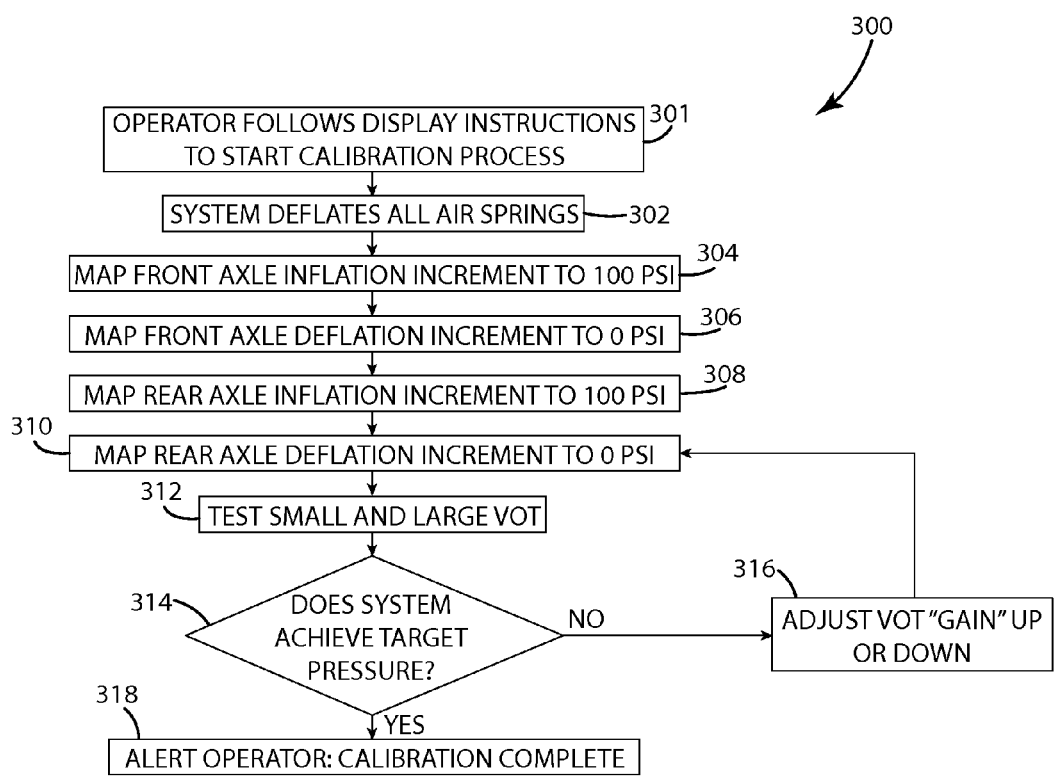
FIG. 6 is a process flow chart for calibrating the control system of the current embodiment.

The calibration process of the current embodiment is illustrated in FIG. 6 and generally designated 300. Initially, the user, also known as the operator, uses the inputs 34 and the on-screen display 32 of the user command interface 30 to start the calibration process for the vehicle 106. Step 301. Once calibration has begun, the controller 10 deflates all of the air springs 52-55. Step 302. Next, the controller 10 inflates and deflates the air springs 52-55 associated with each axle. The air springs 54-55 of the front axle are inflated incrementally to 100 psi. Step 304. For each increment, the controller 10 records the valve-open-time and change in pressure for the air springs 54-55. After air springs 54-55 have reached 100 psi, the controller 10 begins stepwise deflating the air springs 54-55 toward 0 psi, recording the valve-open-time and change in pressure for the air springs 54-55 for each step. Step 306. With the front axle of the vehicle 106 mapped, the controller 10 turns toward mapping the rear axle. The process for mapping the rear axle are similar to the steps for mapping the front axle. That is, the controller 10 stepwise inflates and deflates the air springs 52-53 associated with the rear axle from 0 psi to 100 psi and then back to 0 psi. Steps 308 and 310. For each step, the valve-open-time and change in pressure are recorded. An example calibration map generated during this process is shown in FIG. 9, which shows data for the rear axle in memory locations 0x60 to 0x8F and shows data for the front axle in memory locations 0x90 to 0xBF.

Although the vehicle suspension system may be mapped with the above steps, predicting a valve-open-time to achieve a target pressure may involve more than simply extrapolating the valve-open-time for a given pressure change from the map. For instance, large changes in pressure that require large valve-open-times, which, due to one or more factors (e.g., friction in the suspension system, loading factors, and the stepwise nature of the mapping process), may undershoot the target pressure or may sometimes be inaccurate. As a result, the controller 10 may calculate a gain factor for the predicted valve-open-time as part of the calibration process 300. The controller 10 may run a series of tests inflating and deflating the suspension system with large and small valve-open-times, and then compare actual pressures achieved to the target pressures predicted using the map. For example, the controller 10 may predict a valve-open-time corresponding to a 30 psi change in pressure, and then run a test to determine whether the predicted valve-open-time achieves the 30 psi change within acceptable error limits. Steps 312 and 314. If the controller 10 determines that this difference is within acceptable error limits, the calibration process is complete. Steps 314 and 318. However, if the difference is outside the limits of what is acceptable, the controller 10 may increase or decrease the gain factor in order to improve accuracy. For example, if the controller 10 inflates one or more of the air springs 52-55 using a test valve-open-time, and determines that the actual pressure of the one or more air springs 52-55 is greater than a predicted pressure, the controller 10 may decrease the gain factor to decrease this overshoot. Similarly, if the controller 10 determines that the actual pressure of the one or more air springs 52-55 is less than the predicted pressure, the gain factor may be increased. In one embodiment, the series of tests may be used to develop a gain factor that accurately achieves target pressures for a variety of valve-open-times. In this way, the controller 10 may learn to control inflation and deflation of the air springs 52-55 for the particular vehicle 106 in which the control system 100 is installed. In one embodiment, the gain factor may be applied in long adjustments or large pressure change adjustments but not in small pressure change adjustments in order to achieve target pressures. It should be understood that in other embodiments the gain factor may not be used or may be used in small pressure change adjustments in addition to or alternatively to use in large pressure change adjustments.

The control system 100 may also offer the capability for the user to program target pressures for eight user-defined pre-sets, each preset being tailored to different loading conditions or heights. For example, the user may program pre-sets for driver-only, driver+ three passengers, full load, high height or low height. Of course, more or fewer user-defined presets may be available depending on desired functionality. The control system 100 may also include the ability to monitor and automatically maintain pressure within the air springs 52-55.

Figure 7:
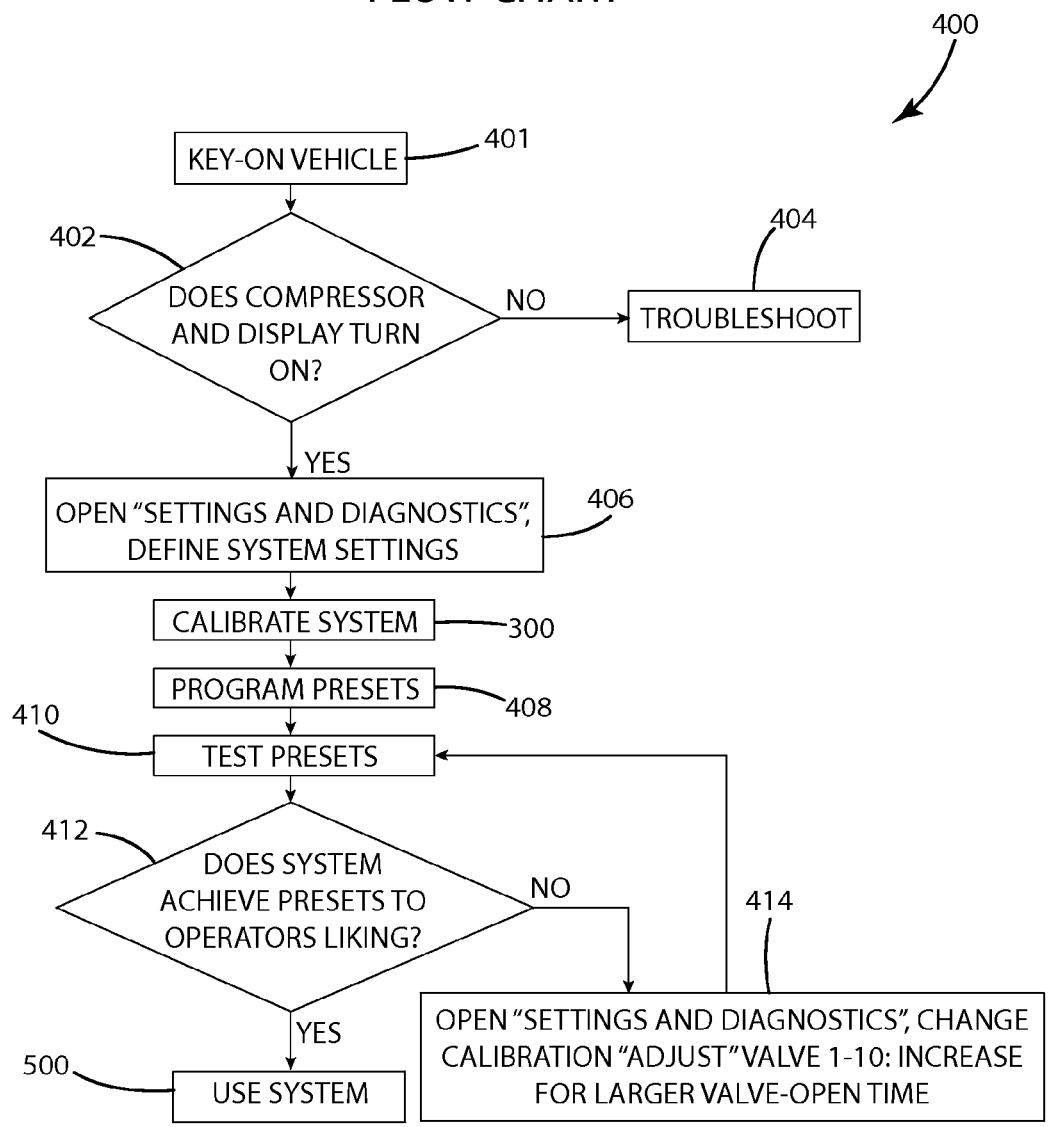
FIG. 7 is a process flow chart for operating and programming presets of the control system of the current embodiment.

With the pre-set functionality and automatic maintenance feature, the controller 10 may provide the user with functionality similar to a height control system. Because the air pressure within the air springs 52-55 may not, without additional information, directly correlate to a vehicle height, the pre-set functionality may allow a user to program a particular association between (a) air pressure and (b) known and/or desired operating conditions. For example, the user may adjust the vehicle to a desired ride height under known conditions (e.g., the number of passengers in the vehicle or a full load), and then store the air pressure associated with those conditions under a pre-set. Later, when under similar conditions, the user may select that pre-set in order to command the control system 100 to adjust to the target air pressure, potentially resulting in a vehicle ride height similar to the ride height of the vehicle when the pre-set was programmed. In this way, the user may achieve functionality similar to a height control system without height sensors. Preset one may be used as the default setting for the control system 100 to operate so that when the vehicle ignition 102 is keyed-on, the control system 100 may inflate to ready the vehicle 106 for immediate operation. Other conditions for possible pre-sets, some of which have been mentioned above, are listed below:

Preset 2: ride height for driver and three passengers
Preset 3: ride height for driver, three passengers and full load
Preset 4: low driving height for driver and one passenger—"boulevard cruising"
Preset 5: high height for obstacle clearance (e.g., clearance for speed bumps or debris in road)
Preset 6: all down for parking lot "laid out" look A method for operating the control system 100 to calibrate to the particular vehicle in which it is installed and to program the presets is illustrated in FIG. 7 and generally designated 400. Once the control system 100 and vehicle suspension system is installed within the vehicle 106, the user may turn on the ignition 102. This activates the control system 100. Step 401. In alternative embodiments, an accessory switch other than the ignition may active the control system 100. In the current embodiment, the control system 100 may check the status of the compressor 66 and the display of the user command interface 30. If there is a problem, the control system 100 may enter a troubleshoot mode; otherwise, the control system 100 may stand ready for operation. Steps 402 and 404. If the control system 100 is being activated for the first time in the vehicle 106, it may automatically enter a "Settings and Diagnostics" mode. Step 406 Alternatively, the user may enter one or more inputs on the user command interface 30 to enter the "Settings and Diagnostics" mode. Although not shown in this method, the control system 100, from the ready for operation mode, may proceed the use system step 416 if the control system 100 has already been calibrated and programmed to the user's liking. Within the "Settings and Diagnostics" mode, the user may enter the calibration process 300 described above in connection with FIG. 6 in order to map the vehicle's response. The user may also program one or more presets described above. Step 410.

Programming one or more presets may involve manually controlling the air pressure within each air spring 52-55 to achieve appropriate air pressure, and desired vehicle height. The user command interface 30 may allow for manual adjustment of pressures of the air springs 52-55. The vehicle 106 may be configured with the known and/or desired operating conditions, such as vehicle loading, to be associated with the manually selected air pressure. Vehicle height may be checked visually or manually, and adjusted to the user's liking. The user may also drive the vehicle 106 at the manually set air pressure to ensure the air pressure is adequate for the known and/or desired operating conditions. With the vehicle 106 configured to the user's liking, the preset may be programmed so that later, under similar operating conditions, the user can select the preset to achieve the desired air pressure in the air springs 52-55. The control system 100 also may allow multiple presets to be "played" together to allow, for example, side to side motion of the vehicle 106.

With the presets programmed (Step 408), the control system 100 begins testing the presets to determine if it can achieve the programmed target pressures according to the user's preferences, and within an acceptable degree of error. At this stage, if the user wants to customize the system, an overcompensation factor may be adjusted; otherwise, the control system 100 is ready for use. Steps 410, 412, 414 and 500. For example, if the user wants the system to raise the vehicle quickly, or slowly, the user may customize the control system 100 accordingly. The controller 10 may be programmed to allow the user to enter an overcompensation factor to the predictive open loop calculation of valve-open-time. The predicted valve-open-time may be multiplied by the overcompensation factor, effectively boosting the valve-open-time to overshoot the target pressure, potentially increasing the rate at which the vehicle raises to the desired height. As described herein, if the control system 100 overshoots the target pressure, the system may then perform another iteration to achieve the target pressure. Accordingly, by providing the user with a user selectable overcompensation factor, the user may tailor and optimize their air suspension control.

Use of the overcompensation factor may also allow the user to tailor the control system 100 to achieve improved success in hitting target pressures in fewer iterations. For example, friction within the vehicle suspension system may affect the ability of the system to achieve a target pressure in less then four iterations. The overcompensation factor provides a way to compensate for these friction effects by increasing the overshoot of the target pressure, thereby increasing the risetime or rate of height change. Likewise, the overcompensation factor may also provide a way to decrease the overshoot of the target pressure, thereby decreasing the rate of height change.

In one embodiment, the control system 100 may automatically maintain preset pressures thereby further enhancing the user's confidence in the control system 100. The user may choose whether to enable or disable the automatic maintenance feature. For example, the automatic maintenance feature may be disabled for performance or track driving or if operating in hilly areas. With the automatic maintenance functionality, the controller 10 may compute a running pressure average at each corner of the vehicle and periodically inflate or deflate to maintain the target pressures. The period may be 2 minutes, but may be longer or shorter depending on desired operating conditions. The automatic maintenance feature can automatically correct a slow leaking air spring circuit, and may improve operator confidence that their system is operating at the correct pressures. If any corner requires three or more inflates, the control system 100 may alert the user with a leak indication on the display of the user command interface 30.

Figure 8:
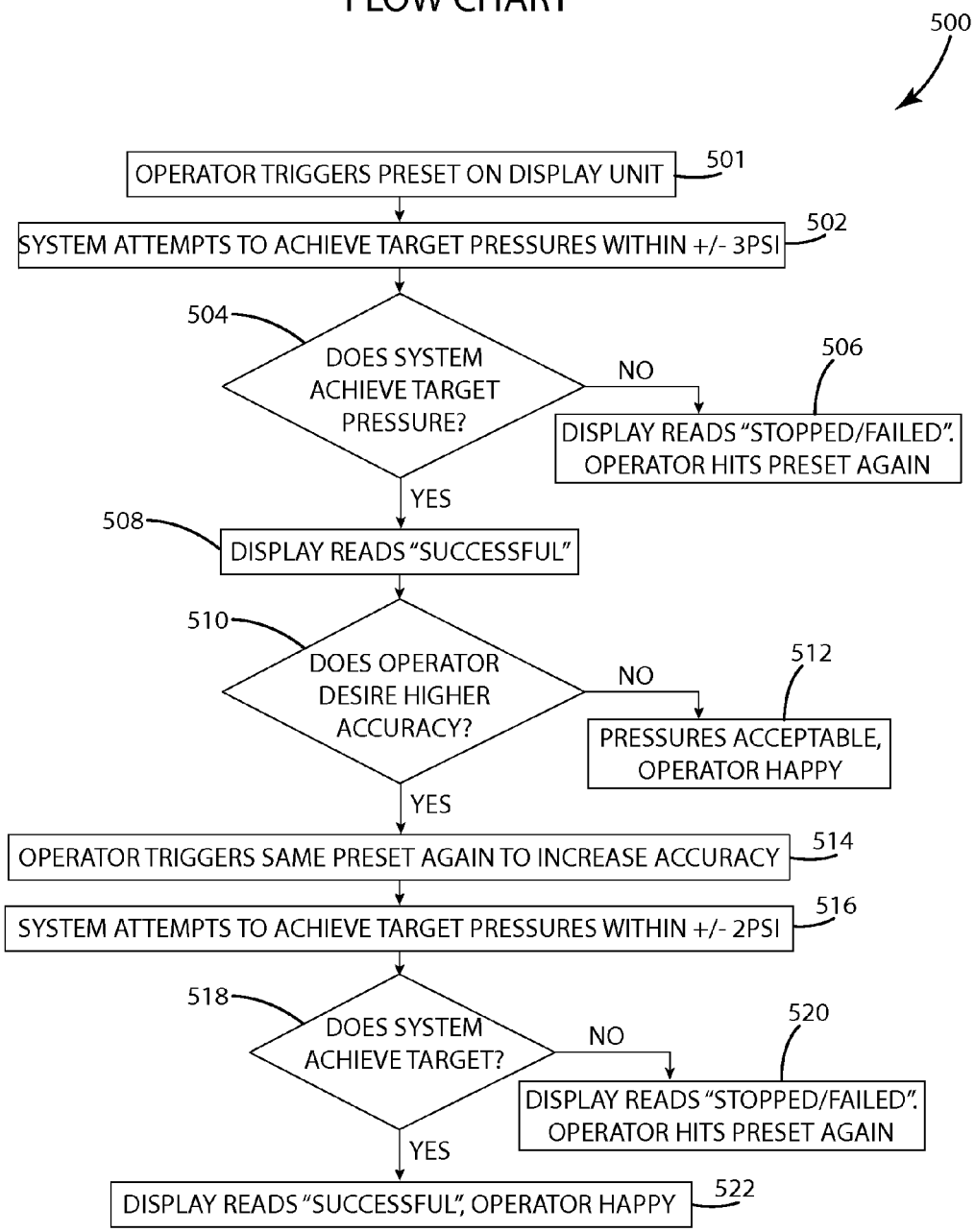
FIG. 8 is a process flow chart for using the control system of the current embodiment.

Turning now to FIG. 8, a method for using the control system 100 to achieve desired settings for the vehicle 106 is illustrated and generally designated 500. Once the user triggers a preset using an input 34 on the user command interface 30, the controller 10 attempts to achieve target pressures, within an acceptable degree or error, associated with that preset. Steps 501 and 502.

To achieve these target pressures at step 502, the controller 10 may determine a predicted valve-open-time for each valve 22 based on the mapped response of the vehicle suspension system. The controller 10 may also base the predicted valve-open-time on at least one of the current pressures of the air springs 52-55, a learned gain factor and an user-programmed overcompensation factor. The controller 10 may obtain the current air pressures of the air springs 52-55, and then determine a predicted valve-open-time based on (a) the mapped response and (b) the difference between the current air pressures and the target air pressures associated with the selected preset. The predicted valve-open-time may then be multiplied by the gain factor determined during the calibration process (e.g., a learned gain factor), and further multiplied by the overcompensation factor (if one has been programmed). The controller 10 may also account for the regulated pressure of the compressor 66, if it has changed since the calibration process was performed. Although described in connection with changing the pressures of all four air springs 52-55, it should be understood that air pressure may be changed for one or more of the air springs 52-55, individually or in any combination. For example, the pressure of the air springs 54-55 coupled to the front axle may be adjusted while the air springs 52-53 coupled to the rear axle may not.

Depending on whether the target pressure is greater or less than the current air pressures of the air springs 52-55, the controller 10 may activate the valves 22 to either exhaust air from the air springs 52-55 through the exhaust port 29 or supply air to the air springs 52-55 from the compressor 66 through the supply port 28. In either case, the controller 10 may activate the valves for a duration substantially equal to the predicted valve-open-time in order achieve the target pressures.

If, after the air pressures within the suspension system have settled, the controller 10 determines that the actual pressures of the air springs 52-55 are at or near the target pressures, within an acceptable degree of error, the user command interface 30 may display an indication of success, such as "Successful". Steps 504 and 508 In the current embodiment, the degree of error is +/−3 psi, but may be adjusted depending on desired operating conditions. If the controller 10 determines that the actual pressures of the air springs 52-55 are not within +/−3 psi of the target pressures, then the display 32 may show an indication accordingly, such as "Stopped", "Failed" or "Stopped/Failed". Steps 504 and 506. The user may initiate a reiteration of step 502 to adjust the air pressures again toward the target pressures. Step 506. In alternative embodiments, the controller 10 may initiate a reiteration of step 502 automatically, and repeat the process one or more times in order achieve the target pressures. This automatic reiteration may be repeated a predefined number of times (e.g., three times) before displaying an indication of failure, if appropriate, to the user.

In one embodiment, the user may desire greater accuracy for the pressures of the air springs 52-55, and initiate a micro-adjustment process to further adjust the pressures of the air springs 52-55 toward the target pressures within a smaller degree of error. However, if the user is satisfied with the actual pressures of the air springs 52-55, the controller 10 may wait for another command from the user. Steps 510 and 512.

For purposes of disclosure, the micro-adjustment process is shown within process 500 and generally includes steps 514, 516, 518, 520 and 522. It should be understood that the process 500 may not include the micro-adjustment process in alternative embodiments. As mentioned above, if the user desires greater accuracy for the pressures of the air springs 52-55, the user may initiate a micro-adjustment via the user command interface 30 by triggering the same preset triggered at step 501. The controller 10 may determine a predicted valve-open-time in a process similar to the one described with respect to step 502, but with a goal of obtaining greater accuracy. For example, rather than aiming for an accuracy of +/−3 psi, the controller 10 may aim for an accuracy within +/−2 psi. Step 516. Remaining steps 518, 520 and 522 of the micro-adjustment process may be similar to steps 504, 506 and 508 described above, but again, with the aim of obtaining greater accuracy.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A fluid suspension control system for controlling fluid pressure of at least one fluid spring within a vehicle, the fluid spring being part of a vehicle suspension system and capable of being inflated and deflated to affect the ride height of the vehicle, said fluid suspension control system comprising:
   at least one valve adapted to selectively control fluid flow to and from the fluid spring;
   a pressure sensor adapted to sense the fluid pressure of the fluid spring; and
   control circuitry operatively coupled to said valve and said pressure sensor, said control circuitry adapted to control a valve-open-time of said valve in order to at least one of pressurize and depressurize the fluid spring, said control circuitry adapted to:
      determine a valve-open-time as a function of a target fluid pressure and a current fluid pressure;
      actuate said valve for a period of time substantially equal to said valve-open-time;
      receive one or more inputs indicative of an actual fluid pressure of the fluid spring, wherein the one or more inputs include a sensed actual fluid pressure of the fluid spring after said valve is actuated for said valve-open-time; and
      based on a difference between said sensed actual fluid pressure and said target fluid pressure, adjust said function such that a future valve-open-time determined based on said function of said target fluid pressure and said current fluid pressure is different from said valve-open-time determined prior to actuation of said valve, wherein actuation of said valve for said future valve-open-time yields a substantial reduction in said difference between the actual fluid pressure of the fluid spring and said target fluid pressure.

2. The fluid suspension control system of claim 1 wherein the vehicle includes a plurality of fluid springs each being part of the vehicle suspension system and capable of being inflated and deflated to affect the ride height of the vehicle, wherein said control circuitry is adapted to control said valve-open-time in order to control pressurization and depressurization of each of the fluid springs.

3. The fluid suspension control system of claim 1 wherein said function includes a map that correlates a change in fluid pressure to a valve-open-time, and wherein said map is developed by mapping said change in fluid pressure with a test valve-open-time, wherein said mapping includes mapping both inflation and deflation events for the at least one fluid spring.

4. The fluid suspension control system of claim 3 wherein said control circuitry is adapted to:
   stepwise pressurize the fluid spring over an inflation range and store said change in fluid pressure and said test valve-open-time for each step; and
   stepwise depressurize the fluid spring over a deflation range and store said change in fluid pressure and said test valve-open-time for each step.

5. The fluid suspension control system of claim 4 wherein said inflation range is from 0 psi to 100 psi, and wherein said deflation range is from 100 psi to 0 psi.

6. The fluid suspension control system of claim 4 wherein said control circuitry stores ten data points during stepwise pressurization and ten data points during stepwise depressurization, said data points forming said vehicle suspension system response.

7. The fluid suspension control system of claim 1 wherein said control circuitry is adapted to activate said valve for a duration substantially equal to said future valve-open-time, thereby controlling fluid pressure of the fluid spring using an open loop control scheme.

8. The fluid suspension control system of claim 7 wherein in response to completion of said duration, said control circuitry is adapted to determine if a substantial difference exists between the fluid pressure of the fluid spring and said target fluid pressure, and based on said substantial difference, predict another future valve-open-time to target achieving said target fluid pressure.

9. The fluid suspension control system of claim 7 wherein said control circuitry is adapted to execute an iteration that (a) predicts, based on said vehicle suspension system response, said future valve-open-time to target achieving said target fluid pressure in the fluid spring and (b) activates the fluid valve for a duration substantially equal to said future valve-open-time to pressurize or depressurize the fluid spring in order to substantially achieve said target fluid pressure.

10. The fluid suspension control system of claim 9 wherein in response to receiving a command to decrease a difference between the fluid pressure of the fluid spring and said target fluid pressure, said control circuitry is adapted to execute said iteration.

11. The fluid suspension control system of claim 9 wherein to decrease said difference between the fluid pressure of the fluid spring and said target fluid pressure, said control circuitry is adapted to execute said iteration three or more times.

12. The fluid suspension control system of claim 1 wherein a user develops an overcompensation factor for said vehicle suspension system response in order to tailor said control system to the user's desired preferences.

13. The fluid suspension control system of claim 1 wherein said overcompensation factor is multiplied with said future valve-open-time in order to overshoot said target fluid pressure.

14. The fluid suspension control system of claim 1 wherein said control circuitry is adapted to store at least one preset that associates a desired height of the vehicle with said target fluid pressure, wherein the vehicle is under one or more known loads.

15. The fluid suspension system of claim 14 wherein the one or more known loads include at least one of a number of passengers within the vehicle and known materials loading the vehicle.

16. The fluid suspension control system of claim 14 wherein said at least one preset includes a desired ride height preset, an obstacle clearance preset, and a parked state preset.

17. The fluid suspension control system of claim 1 wherein said control circuitry is adapted to monitor fluid pressure in the fluid spring during operation of the vehicle and to control said fluid valves to maintain said target fluid pressure.

18. The fluid suspension control system of claim 1 wherein the control circuitry is adapted to obtain learned information based on a comparison between said sensed actual pressure of the fluid spring and said target pressure of the fluid spring, wherein said control circuitry is adapted to determine said future valve-open-time based on changes that occur during operation and the learned information.

* * * * *